US00RE42936E

(19) United States
(12) Reissued Patent
Hollis

(10) Patent Number: US RE42,936 E
(45) Date of Reissued Patent: Nov. 15, 2011

(54) METHOD AND APPARATUS TO MINIMIZE COMPUTER APPARATUS INITIAL PROGRAM LOAD AND EXIT/SHUT DOWN PROCESSING

(76) Inventor: William K. Hollis, Duvall, WA (US)

(21) Appl. No.: 12/614,184

(22) Filed: Nov. 6, 2009

Related U.S. Patent Documents

Reissue of:
(64) Patent No.: 7,299,346
Issued: Nov. 20, 2007
Appl. No.: 10/342,020
Filed: Jan. 14, 2003

U.S. Applications:
(63) Continuation-in-part of application No. 10/183,709, filed on Jun. 27, 2002, now abandoned.

(51) Int. Cl.
*G06F 9/24* (2006.01)
*G06F 15/177* (2006.01)

(52) U.S. Cl. ..... 713/1; 713/2; 713/100; 709/222; 710/8; 710/10

(58) Field of Classification Search ..... 713/1, 2, 713/100; 709/222; 710/8, 10
See application file for complete search history.

(56) References Cited

U.S. PATENT DOCUMENTS

| | | | | |
|---|---|---|---|---|
| 5,168,555 | A | 12/1992 | Byers et al. | |
| 5,269,022 | A | 12/1993 | Shinjo et al. | |
| 5,410,699 | A | 4/1995 | Bealkowski et al. | |
| 5,710,930 | A | 1/1998 | Laney et al. | |
| 5,748,957 | A | 5/1998 | Klein | |
| 5,884,211 | A | 3/1999 | Pauli et al. | |
| 5,935,228 | A | 8/1999 | Shinomura | |
| 5,951,700 | A | 9/1999 | Klein | |
| 5,968,173 | A | 10/1999 | Watts, Jr. | |
| 6,061,788 | A | 5/2000 | Reynaud et al. | |
| 6,073,232 | A | 6/2000 | Kroeker et al. | |
| 6,098,158 | A | 8/2000 | Lay et al. | |
| 6,122,677 | A | 9/2000 | Porterfield | |
| 6,148,322 | A | 11/2000 | Sand et al. | |
| 6,202,091 | B1 | 3/2001 | Godse | |
| 6,212,632 | B1 | 4/2001 | Surine et al. | |
| 6,367,074 | B1 * | 4/2002 | Bates et al. | 711/170 |
| 6,553,432 | B1 | 4/2003 | Critz et al. | |
| 6,567,912 | B1 * | 5/2003 | Belkin et al. | 713/2 |
| 6,631,469 | B1 | 10/2003 | Silvester | |
| 6,883,091 | B2 | 4/2005 | Morrison et al. | |
| 6,973,447 | B1 * | 12/2005 | Aguilar et al. | 1/1 |
| 2001/0047473 | A1 | 11/2001 | Fallon | |
| 2001/0052038 | A1 | 12/2001 | Fallon et al. | |
| 2002/0199093 | A1 | 12/2002 | Poisner et al. | |
| 2003/0070066 | A1 | 4/2003 | Cross et al. | |
| 2003/0135729 | A1 | 7/2003 | Mason et al. | |

* cited by examiner

*Primary Examiner* — Chun Cao
*Assistant Examiner* — Michael J Brown
(74) *Attorney, Agent, or Firm* — Lowe Graham Jones PLLC

(57) ABSTRACT

A method to reduce and thereby improve the initial program load time of a computing apparatus operating system and thus provides for near instantaneous user interaction. When practicing the instant invention, a computing apparatus operating system or application processing component is loaded neither sequentially nor completely, but rather on an as required basis. The invention's "required only" loading of processing components persist through subsequent operation and shut down of the computing apparatus with each loaded task creating a checkpoint record of processing modifications to non-volatile memory. Such checkpointing allows shut down processing of the apparatus to consist of merely flushing memory buffers in the apparatus checkpointed non-volatile memory of the apparatus to permanent storage and powering off of the apparatus, with subsequent initial program load (IPL) sequencing referencing the checkpointed records to minimize future system initialization elapsed time.

27 Claims, 3 Drawing Sheets

METHOD AND APPARATUS TO MINIMIZE COMPUTER APPARATUS INITIAL PROGRAM LOAD AND EXIT/SHUT DOWN PROCESSING

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a Reissue of U.S. application Ser. No. 10/342,020, filed Jan. 14, 2003 (U.S. Pat. No. 7,299,346 B1 issued Nov. 20, 2007) to William K. Hollis.*

REFERENCE TO PENDING APPLICATIONS

This application is a continuation-in-part patent application based upon U.S. patent application Ser. No. 10/183,709 entitled "A Method and Apparatus to Minimize Computer Apparatus Initial Program Load and Exit/Shut Down Processing" filed Jun. 27, 2002 now abandoned.

REFERENCE TO MICROFICHE APPENDIX

This application is not referenced in any microfiche appendix.

TECHNICAL FIELD OF THE INVENTION

The present invention relates to operating systems for computer apparatuses, and more particularly, to a method to reduce and improve the initial program load time of a computing apparatus operating system and shut down processing associated therewith.

BACKGROUND OF THE INVENTION

When a computing apparatus is power on, numerous and varied software components are loaded into its RAM (Random Access Memory). As used herein, the term computing apparatus is used synonymously with the terms personal computers, portable personal electronic devices, personal digital assistants (PDA's), and other similarly intended apparatus. As more and more auxiliary devices and functions are integrated into computing apparatuses additional RAM is required to accommodate operating and application system functionality requirements. Further, users continue to demand enhanced functionality of hardware devices, additional software must also be loaded into RAM during device initialization to drive such functionality. As RAM must be validity checked during and after every power on sequence to verify its continuing integrity and associative increase in the time required for RAM validation is often perceived by the user of the apparatus.

It would seem as processors increase in speed, computing apparatuses operating under control of their respective control programs should be able to boot (a.k.a. "load") faster. However, given the requirements for additional functionality associated with these computing apparatuses and the necessity of ensuring the integrity of RAM processing, such devices require more time than ever to boot (as used herein the term "boot" is used synonymously with the initial program (IPL) of one or more operating system or application program sequence necessary to execute a desired function).

In an associative manner shut down processing or termination processing, given the advances of the art, should require the simple act of minimal cleanup by the operating system resulting in almost immediate shut down of the computing apparatus. However, the status of the present art requires the operating system, or more precisely an operating system or application program processing component associated therewith to attempt to shut down each and every task, and each and every device attached to the computing apparatus to cease operation (even if that task/device is not responding or otherwise presently active in the terminating computer device).

In a number of prior art references, improvements in initial program load time(s) have been asserted. For example, U.S. Pat. No. 5,968,173 entitled "Method and System for Maximizing the Apparent Initial Processing Capability of a Computer" purports to disclose and claim a method and system reduce the apparent time between turning on a computer and making available the computer processing capability. The method and system of the '173 patent includes and states in part " . . . displaying within a shortened predetermined time period an interface screen that includes a plurality of interface checkpoints and address data relating to application programs associated with the user interface checkpoints. The shortened predetermined time period has a duration substantially shorter than the period associated with booting the associated application programs. In turning off computer, the method and system include generating a shut down command to computer and storing interface screen and any data files that are open at the time of turning off the computer. The interface screen and data files are stored so that upon subsequently turning off the computer, computer displays interface screen in the shortened predetermined time."

Another example of a prior art reference purporting to accelerate processes associated with initial program load and/or termination processing are disclosed in association with U.S. Pat. No. 6,073,232, entitled "Method for Minimizing a Computer's Initial Program Load Time after a System Reset or a Power-on Using Non-volatile Storage" discloses in part a method for increasing boot speed of a host computer with associated hard disk drive generates a preftech table that contains pointers to disk locations and lengths of the records of an application program requested by the host computer during an initial power-on/reset. During the next power on/reset, before the host computer is ready for data but after the disk drive has completed its reset routine, using the preftech table the disk drive accesses the previously requested data and copies it onto the cache of the disk drive, from where it is transferred to the host computer when the host computer requests it. The preftech table is updated to reflect disk location changes for the various records, or to reflect new records that were requested by the host computer but not found in cache during the previous power-on/reset).

Yet another reference allegedly shortening the time required to "boot" a computer system is found in U.S. Pat. No. 6,098,158, entitled "Software-enabled to Fast Boot" wherein the abstract of said reference discloses a method of generating a boot image and using the boot image to restore a computer system having a processor, an operating system, physical memory, virtual memory and disk storage. The method may be initiated from any particular software application, or at multiple execution points within a particular application. By providing full virtual memory support in the boot image, the computer system may be restored to any predetermined operating state.

U.S. Pat. No. 6,122,677, entitled "Method of Shortening Boot Uptime In a Computer System" purports to disclose a method of configuring peer devices without the unnecessary delay in boot up time using a compatibility bridge and discloses in part, "Upon initiating a configuration cycle, a BIOS initialization scans all peer devices located on the host bus. A watchdog timer times out after a predetermined duration when the intended apparatus fails to respond to the configuration cycle. A bit corresponding to the particular apparatus is set in a scorecard register. The compatibility bridge responds to the configuration cycle after the watchdog time-out period)"

U.S. Pat. No. 5,269,022, entitled "Method and Apparatus for Booting a Computer System by Restoring the Main Memory from a Backup Memory" purports to disclose a method of generating a boot image and using the boot image to restore a computer system having a processor, an operating system, physical memory, virtual memory and disk storage.

U.S. Pat. No. 5,269,022, according to the Abstract stated therein, purportedly discloses, "In a computer system, when the system is first booted in a normal mode, main memory data stored in a main memory immediately after the system is booted, is stored as backup data in a backup memory or the like. A backup flag representing whether or not the backup data can be restored is set and the system is rebooted. When the system is next booted in the normal mode, the backup data stored in the backup memory or the like is restored as the main memory data in the main memory. The backup flag is automatically reset in a maintenance mode.

U.S. Pat. No. 5,710,930, entitled "Apparatus and a Method for Allowing an Operating System of a Computer to Persist Across a Power Off and On Cycle", wherein said patent's abstract purports to disclose, "A method of allowing an operating system of a computer system to persist across a power off and on cycle is described. The method includes the step of detecting if the computer system is to be powered off. If the computer system is detected to be powered off, the state of the computer system is then preserved by storing data representing the state of the computer system in a designated area of nonvolatile memory of the computer system. A system initialization code of the operating system is then replaced with new system initialization code that branches to restart code that accesses to the designated area of the nonvolatile memory such that when the computer system is again powered on, the restart code accesses the designated area of the nonvolatile memory for the data to restore the computer system to the state before the computer system was powered off.

U.S. Pat. No. 5,797,003, entitled "Quick Access to Computer Applications" wherein the abstract purports to disclose, "In general, in one aspect, the invention features a method for enabling a user of a computer to rapidly begin using an application which had been previously placed in a non-running state. Prior to the time when the application was placed in the non-running state, information defining an image of an interactive screen associated with the application is stored in the memory of the computer and locked to prevent corruption by other running applications. Then, in response to a request from the user to begin using the application, and before the application has been fully loaded into memory and is again running, the image defined by the stored information is displayed to the user. In this way the user is given the impression that the application has become immediately available.

As distinguished from the disclosure and claims of the instant invention, the common deficiency in all of the above-noted prior art references is that each reference expressly or implicitly attempts to restore the computing apparatus to a state reflecting its most recent status prior to shut down or termination processing. Consequently, the common deficiency in all of these references each is that each attempts to restore the computing apparatus to reflect its most recent fully loaded and executing status prior to termination.

Again using the "standard" approach for a boot all memory must first be verified error free and the state of the machine must be loaded from non-volatile random access memory NVRAM (hard drive, flash, etc.). While this approach does reduce time in loading each component from the NVRAM apparatus and integrating it into the operating system, it fails to address or remedy errors in the previously saved image. Had saved information been save incorrectly, if there were errors in software executing at the time it was saved as an image, such errors are routinely loaded back into memory when the apparatus is again activated. Consequently, this flawed methodology requires the computer to be shut down and rebooted yet again after loading the flawed image.

Another flawed approach to enhance boot improvement and termination processing found in the contemporary art is the loading of a memory image to disk once the apparatus has been booted (attempting to minimize the above errors). However, if new software has been loaded, subsequent to this image copy, the computer then must be completely rebooted to recreate a current accurate image of the operating system (as used herein, the term operating system is used synonymously with the term "control program" and relates both to processes associated with initial program load and termination processing as well as dispatching control exercised over application end user oriented programs.

BRIEF SUMMARY OF THE INVENTION

Responsive to the foregoing challenges, Applicant has developed an innovative method of optimizing the booting of a computing apparatus to allow that apparatus to function as quickly as possible for its main (intended purpose) by loading portions of the operating system as needed. Processes of the instant invention are equally applicable to any number of computing apparatuses. For purposes of full and enabling disclosure, illustrative examples of the instant invention's practice with respect to a PC and personal digital device (herein synonymously referred to as "PDA") as well as user module interfaces are provided.

The inventions methodology assumes and expects all software to maintain logs of changes to its data files (user input) to expedite the shut down of the apparatus. User shut down or loss of power input causes NVRAM buffers to be flushed (hard drives, etc.) (as indicated in block 20) to the static memory of the NVRAM apparatus and the apparatus to be shut down (as indicated in block 21).

When practicing the instant invention, the computing apparatus is booted from software which is stored on non-volatile random access memory device and not from an "executing" image of RAM when it was last shut down. Consequently, an object of the invention is a prioritization of loadable tasks wherein only operationally essential tasks are loaded into RAM and executed as quickly as possible with ancillary functions loaded subsequent thereto, if at all.

As will be described throughout the disclosure of the instant invention, the methodology of the instant invention is equally applicable to a variety of computing apparatuses, such as but not limited to personal computers, routers, and hand-held personal devices (digital assistants, MP3 players, etc.). For purposes of full and enabling disclosure as well as ease in comprehending the adaptability and versatility of the instant invention to a variety of computing devices, the immediately following discussion illustrates "commonality" of the instant invention's practice with respect to personal computers, routers, hand held personal devices during boot execution and shut down/termination processing of each device type.

INVENTION BOOT PROCESSING SUMMARY

When the apparatus is powered on (as indicated in block 1), only the amount of RAM required to load (as indicated in block 3) core operating system processing components is checked for errors (this initial RAM check may be avoided in computing machinery executed exclusively from NVRAM on the apparatus). As practiced by the instant invention, any RAM not specifically required for initial startup is verified/validated on a as needed basis (i.e., when to load a "primary" function) or as free CPU cycles allow). In the instant invention, errors in RAM will not preclude the apparatus from booting (as indicated in block 7). Such errors are maintained in a table as memory address(es) to be avoided. The user is notified of errors within the apparatus, RAM and the apparatus error address(es) "patcharound."

"Highest priority" tasks (and all sub-tasks required to support these tasks) are loaded next (as indicated in block 9). The following are examples of such task loading by device type:

A. On a personal computer, the monitor driver, the mouse driver and the keyboard driver (in that order).
   1. The monitor driver maintains a small database on the hard drive consisting of the background and all icons displayed on the desktop. This database is displayed almost instantaneously by the instant invention.
   2. The mouse driver is loaded next as this is generally typically what the user will require next.

B. On a router (such as, but not limited to a Cisco® router).
   1. The basic input/output system (BIOS) loads only enough of itself to determine if a valid image in flash memory exists and if the configuration boots to that image. If found, then the image in flash memory starts booting.
   2. The router next concentrates interface(s) execution with respect to the OSI (Open Systems Interconnection) seven layer model. Concentration emphasis is on layer one ("line up"), then layer two ("protocol up") and last layer 3.
   3. The image booting next determines the type routing (layer three) required (IP (Internet Protocol), IPX (Internet Packet Exchange), Appletalk, X.25, Frame Relay, etc.) and loads only those portions of the IOS (Cisco's Internet Operating System) that are required. If BGP (Border Gateway Protocol) is not in the configuration, the BGP is not loaded.
   4. An additional feature of the instant invention is to accommodate a router's maintaining of statistics (stored in NVRAM and regularly updated to allow for changes in traffic flows) which interfaces are busiest and thus allowing prioritization for making those interfaces operational.
   5. When the router has completed all tasks related to "routing", the invention allows user interaction via the console should be run (on exception to this is, of course, allowing operator input to stop the initial boot sequence to correct router problems).

C. On a hand held "personal device"
   1. The display is immediately visible (a "splash" screen can be shown first if absolutely necessary) showing the "main function" of the apparatus.
      a) A cell phone would display the main menu
      b) a MPEG (Moving Pictures Expert's Group) would display video
      c) A MP3 player would display the songs that are on the playlist
      d) A hand held video game would display the start screen
   2. Function buttons are next made accessible to the user
   3. The apparatus then load, tasks that are its "primary" function
      a.) A cell phone would load the task to access its directory of phone numbers
      b.) A MP3 player would load the task to play music (with pointers to the current song, the past two songs and the next two songs)
      c.) A hand held video game would load the start of the game

INVENTION EXECUTION SUMMARY

After the absolute highest priority tasks are loaded (as indicated in block 3) attention is turned to performing highest priority tasks interspersed with cycles for lower priority tasks. Some of the lower priority tasks would include, but not limited to: completion of checking RAM for errors and/or keeping track of user initial actions and proactively loading those tasks into main memory in anticipation of what the user may do (and updating a database that record user actions).

Application software executing on this computing apparatus should "play well" with the operating system. That is, application software (when started) should be compatible with and adhere to the above "fast boot" checkpointing methodology of the instant invention. Plugins should be loaded only when needed. As an example, an initial "splash" screen should be minimal followed by a "untitled" word processing document ready for editing, or another document requested by the user.

INVENTION SHUTDOWN PROCESSING SUMMARY

Apparatus power off can be either user initiated or can be loss of power to the apparatus (plug pulled, battery runs out) (as indicated in blocks 20, 21 and 22). In its practice, the instant invention assumes the apparatus is designed to allow the core task has enough time and power to flush all NVRAM buffers. An interrupt from the power supply to the core task would be best approach towards ensuring this capability.

If all software running on the apparatus "plays well" as in the preceding paragraph, then a simple flush of the NVRAM buffers would save all logged information just before shut down. After the flush of buffers, the apparatus then powers off.

Additional objects and advantages of the invention are set forth, in part, in the description which follows and, in part, will be apparent to one of ordinary skill in the art from the description and/or from the practice of the invention.

These together with other objects of the invention, along with the various features of novelty which characterize the invention, are pointed out with particularity in the claims annexed to and forming a part of this disclosure. For a better understanding of the invention, its operating advantages and the specific objects attained by its users, reference would be had to the accompanying drawings, depictions and descriptive matter in which there is illustrated preferred embodiments and results of the invention.

DETAILED DESCRIPTION OF THE PREFERRED EMBODIMENT

Figure 1:
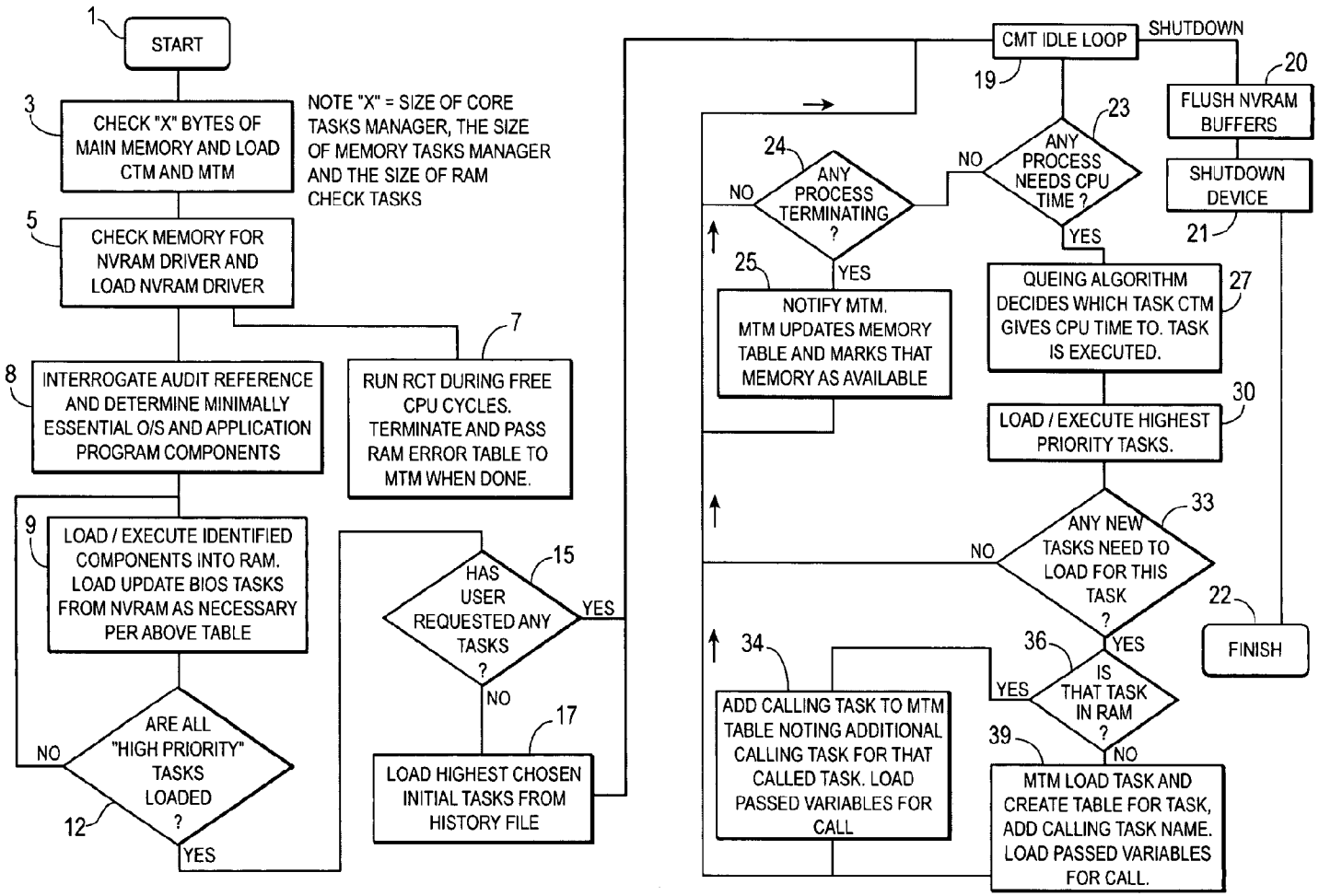
FIG. 1 is a logic flow illustration of the invention's practice with respect to a general purpose personal computing apparatus.

It is understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

In this respect, before explaining at least one embodiment to the invention in detail, it is to be understood that the invention is not limited in this application to the details of construction and to the arrangement so the components set forth in the following description or illustrated in the drawings.

The invention is capable of other embodiments an of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore that the claims be regarded as including such equivalent constructions insofar as they do not depart from the spirit and scope of the present invention.

Further, the purpose of the foregoing abstract is to enable the U.S. Patent and Trademark Office and the public generally, and especially the design engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to scope of the invention in any way.

The apparatus and the method of the instant invention rely upon processing steps which first requires the loading and initiation of a BIOS (Built In Operation System) initialization routine.

The instant invention next limitedly validates that portion of RAM (as indicated in block 3) to be used accommodate the selective BIOS "load" initialization routine to ensure it is free of addressing or error exceptions. To the extent that portion necessary to accommodate the initialization routine, and only that portion necessary in order to accommodate the initialization routine, is checked for validated addressability thus saving the necessity of validating all RAM accessible to the device.

Should an error be found in the RAM thus verified, the instant invention practice is to patch around such invalid addresses and allow the loading of the device to proceed (as indicated in block 7). Consequently, the portion of the operating system to be loaded into RAM would be comprised of a core task manager (CTM) and memory task manager (MTM) with the function of the CTM to manage and prioritize tasks (operating systems tasks and program system calls, etc.) and the function of the MTM to manage memory, ram, virtual memory, vm paging, etc. The MTM tracks RAM usage and, if required, facilitates paging in and out of virtual memory (as indicated in block 9). The MTM also tracks which tasks (driver system) are no longer active and determines if additional RAM is required, such RAM can be reused (as indicated in block 9). Should a system routine be resident in memory (but not active) it can be immediately reactivated and used without requiring the instructions to be reloaded into memory from non-volatile RAM.

For purposes of full and enabling disclosure, processing steps which facilitate the loading and initiation of a bios initialization routine for the instant invention are immediately provided in commentary and pseudocode format.

```
Start (as indicated in block 1)
/*SizeOfCTMMTM is the total size of the RAM needed to load CTM and MTM driver. 25989 bytes is just an example number for size of CTM and MTM, and SizeOfMemory is just an example size of 256 Mb RAM (Total System Memory).*/
SizeOfCTMMTM=25989
SizeOfMemory=256000000
Base= 0
Mem= 0
/*Verify the memory needed for the CTM and MTM*/ (as indicated in block 3)
WHILE (Mem – Base) <SizeOfCTMMTM and Mem <SizeofMemory DO
Verify memory location Mem does not have errors
IF location Mem has errors Base=Mem +1
Mem=Mem+1
ENDWHILE
IF Base=SizeOfMemory them display memory error message and halt. No room to load tasks /* Load the CTM and MTM and execute. CTM and MTM have the highest priority of all tasks, level 0. */
Load CTM and MTM tasks into RAM locations Base thru Mem and start execution of CTM and MTM at priority 0
/* Keep track of how many tasks there are. CTM and MTM are required and do not count as tasks. All tasks except CTM and MTM should be eligible to be swapped out of memory. RCT does count as a task.*/
Tasks=0
/* Set up start of memory for RCT*/
RCTMem=Mem +1
```

Following initiation of the initialization routine for a personal computer, the operating system of the instant invention, first interrogates an audit reference to identify those minimally essential operating system and application program (as indicated in block 8, FIG. 1) startup processing components necessary to effectuate user communication with the apparatus. These device dependent audit references are contained within a data reference accessible to the device and most easily comprehended as checkpoint records wherein the operating system and application program prosecution status is recorded for later reference. Having once interrogated the audit reference, the instant invention next selectively retrieves the identified startup program components and thereby bypasses at least a portion of BIOS instruction set normally required for establishing interactive communication between a user and the apparatus. That is, the instant invention identifies those portions of the BIOS initialization to be loaded to RAM to effectuate such communication and then bypasses other "standard" portions of BIOS processing which are necessary to effectuate almost instantaneous user communication.

The instant invention next determines an apparatus specific highest priority task and initiates execution of the task (as indicated in block 12). Such tasks are obviously determined by the function of the device with the tasks and the respective priorities stored a non-volatile memory as a task list (TL) or as a table in the CTM and ROM. The CTM then passes the name and size of the application to the MTM and loads the task into memory and passes the task back to the CTM for execution. As an example, the first task on a personal computer is the loading of the driver for hard drive for the additional driver application can be loaded. While the first task of any personal device (MP3 player, PDA, etc.) is to display and the first task of a router would be to determine whether there was a valid boot entry on its non-volatile RAM, a flash card or hard drive (as indicated in block 18, FIG. 3). The instant invention next highest determines what is the next execution priority task in the task list, and executes that task and continues to execute each subsequent "next priority task" until the task load is completed (as indicated in block 30). Once all such tasks are loaded dispatching control of the operating system is turned to all system and application components necessary to effectuate normal operation. During this normal or standard operation, the MTM initiates all tasks and tracks the task memory requirements (as indicated in blocks 36 and 39). Each task is individually responsible for managing its own temporary files and logging all modifications to those files as such modifications were made. When the files are saved, the original file plus the logged or audit changes are kept in a file. The original file is kept until creation is completed. Then and only then is the old file deleted from the non-volatile RAM device.

As a natural extension of this embodiment, applications should load with the minimal amount of software to allow the main page and menu to be displayed. Plugins and other "extraneous" subroutines should not load until the operator requests that function/subroutine.

For purposes of full and enabling disclosure, commentary and illustrative pseudocode is immediately provided which further illustrates and discloses the invention processing component execution sequencing.

Core Task Manager (a.k.a. "CTM") Main Execution (as indicated in block 27)
Pass NVRAM task to MTM to allocate memory/ load NVRAM task
Tasks = Tasks +1
(as indicated in block 25)/* The MTM Task Table is an array holds an array of data that pertains to each task. Items this table contains about each task are, for example, the task memory location, priority, passed parameters, whether that task is executing or just loaded, a list of tasks that call that task */
MTM Task Table [Task] = NVRAM Task information
/* NVRAM task, MTM, RCT and the NVRAM table (see below) are most likely "critical" components of operation. If the MTM returns a memory allocation error then the system should display a "out of memory/bad memory" error and halt. */
IF MTM returns "No Memory Available" error, then display error message and halt
/* The priority of the NVRAM task is dependent on each device. In the example of a personal computer the NVRAM task should have a lower priority than the Display, keyboard or mouse task.
*/
Start execution of NVRAM task at priority X (as indicated in block 30)
Pass RCT task to MTM to allocate memory / load RCT task
Tasks = Tasks + 1
MTM Task Table [Tasks] = RCT Task information
IF MTM returns "No Memory Available" error, then display error message and halt (as indicated in block 36)
RCT task is lowest priority (priority Y) on the CTM task list. RCT is to run only when there are free CPU cycles or at a high priority if MTM needs more memory to load a task. */
Start execution of RCT task at priority Y
/* The NVRAM table has a list of "high priority" tasks (and their associated priority) that need to be read from BIOS into main memory, a list of the BIOS tasks that have updated code that resides on NVRAM (again with a priority) an the History data. The "History data" is device dependent (see below). Note: A default table can reside in BIOS for initial device operation or if the NVRAM table is destroyed. */
Read NVRAM table of BIOS tasks, Updated BIOS tasks and history from NVRAM
/* Entries in the NVRAM table should include task location, size, priority "Z" */
WHILE entries in BIOS / NVRAM task list DO
Pass task to MTM to allocate memory / load task
Tasks = Tasks + 1
MTM Task Table [Tasks] = BIOS / NVRAM Task
IF MTM returns "No Memory Available" error, then display error message and halt
Start execution of task at priority Z (as indicated in block 30)
/* Continue execution of tasks in the MTM task table. */
CALL Execute Tasks
ENDWHILE
/* The entries in the History table include a priority level and a "load/run" bit. The load/run bit tells whether the task is preloaded into RAM, but not executed until the device requests them (e.g. task for what to do when the user presses a particular button of the front panel or the application the user "usually" double clicks on first) or tasks that are not the absolute highest priority but still need to be loaded and run at device startup (e.g. tasks for interface operation on a router or on a server the applications that run on the server at initialization). The "load" tasks are "historically" the first tasks that the system executes after it is fully operational. The "Load and Run" tasks are configured by the operator of the device. */
WHILE entries in history table Run bit set DO
Pass task to MTM to allocate memory/load task
Tasks = Tasks + 1
MTM Task Table [Tasks] = Task
Start execution of task at priority indicated in History table
/* Continue execution of tasks in the MTM task table. */
CALL Execute Tasks
ENDWHILE (as indicated in block 23)
/* If the invention receive operator input while the invention are loading tasks, stop loading tasks and execute operator requested task */
WHILE entries in history table Load bit set AND no operator input DO
Pass task to MTM to allocate memory/load task
Tasks = Tasks + 1
MTM Task Table [Tasks] = Optional Task
CALL Execute Tasks
ENDWHILE (as indicated in block 20, 21, 23 and 33)
/* CTM Main loop. The Shutdown flag is set to 1 upon interrupt from the user (graceful shutdown) or upon receipt of a power loss interrupt from the power supply (immediate shutdown). Upon receipt of either flag the CTM should IMMEDIATELY branch to the shutdown routine. */
Shutdown = 0
WHILE Shutdown Flag not set DO
CALL Execute Tasks
ENDWHILE CALL Shutdown
MEMORY TASK MANAGER (a.k.a. "MTM") SUBROUTINE
/* The MTM tracks RAM usage and (if required/if available) does paging in/out of Virtual Memory (VM). The CTM or MTM protects the tasks from other tasks overwriting them (segmentation violations) and should discourage self modifying programs via not allowing "data" to be executed (helps prevent possible viral attacks/buffer overflow attacks). Memory protection would be via memory protection hardware or strong memory protection AKAUNIXOS. The MTM tracks which tasks (drivers, system calls, applications) are active and which are no longer active so that if RAM is required then that RAM can be reused. Memory is not changed until something is loaded into that address space. If a system routine is already in memory (albeit not active at the moment) then it can be immediately reactivated and used without requiring the instructions/data be reloaded into memory from NVRAM (a waste of load time and presumably NVRAM is a slower access device than RAM). */
/* MTM Called to add task if DontNeedTask = 0 */ (as indicated in block 34)
IF DontNeedTask = 0 THEN DO
/* The history table needs to be updated on a device by device basis. In the case of a personal computer the MTM should track the first "X" tasks the user requests and combine that information in the history table with respect to the previous information to give a cumulative history of the user's actions at startup. In the case of a router the router should keep a history of the highest traffic interfaces and write that information to NVRAM on a periodic basis. This gives the router an idea next time it starts up which interfaces should have the highest priority task initialization/execution. In the case of an MP3 player the MP3 player should track which button is historically pusher first and load that task first. */
SizeOfMemory = Size of task to be loaded
IF (Memory available) < SizeOfMemory then DO
/* Try to complete checking more RAM to load task */
WHILE RCTComplete = 0 and (Memory available) < SizeOfMemory DO
Execute RCT Task
ENDWHILE
/* Check and see if there is enough memory now. If not then free up memory from tasks that are not required. Worst case page out to Virtual Memory (if available) */
IF (Memory available) < SizeOfMemory then DO
MTMTask = 1
WHILE ((Memory available)<SizeOfMemory) and MTMTask<Tasks DO
/* If there is a task in memory that is not called by anything then that task is eligible to be freed. Add that task to the memory available list */
IF MTMTaskTable[MTMTask, AvailableForRAM] = 0 then DO
  add that RAM to Memory Available
  Clear MTMTaskTable[MTMTask]
  Tasks = Tasks− 1
  ENDIF
  MTMTask = MTMTask + 1
ENDWHILE
/* If the invention still don't have memory then try Virtual Memory or error out */
IF VirtualMemory is available DO
Swap task(s) to VirtualMemory until ((Memory available) >SizeOfMemory
ELSE DO
Display error Message out of memory
CALL Shutdown
ENDIF
ENDIF
ENDIF
Load Task into RAM
Task = Task + 1
MTMTaskTable[Tasks] = Task (as indicated in block 39)
/* Load Task is set to 1 to just load task, set to 0 if task is to be loaded and run after it is loaded */
MTMTaskTable[Tasks, Load Task] = Load Task
/* Otherwise it is a Delete Task call */
ELSE DO
MTMTaskTable[MTMTask, AvailableForRAM] = 0
MTMTask = 1
/* If the task is not required any more, go thru the list of tasks and remove that task from the called subtask list also. If the subtask is needed in the future it can be added/reloaded at a later time */
WHILE MTMTask< Task DO
  IF MTMTaskTable[Looptasks] is in the MTMTaskTable [MTMTask] list then remove MTMTAskTable[Looptasks] from that list
MTMTaskTable = MTMTask + 1
ENDWHILE
ENDIF
/* Set all the flags back to 0 (Not Set) */
Load Task = 0
DontNeedTask = 0
ENDSUBROUTINE
RCT SUBROUTINE
RCTComplete = 0
While RCTMem < SizeOfMemory DO
Verify RCTMem is free of errors
/* Since most memory errors occur in "Blocks" the MEMBad table will most likely consist of list of blocks of bad memory cells rather than individual cells that are bad. If any memory cells are found to be bad then that should somehow be reported to the user of the device. */
  IF RCTMem is not free of errors, add that memory location to the MEMBad table
RCTMem = RCTMem + 1
ENDWHILE
RCTComplete = 1
ENDSUBROUTINE
SUBROUTINE Execute Tasks
/* The Execute Tasks subroutine should follow the paradigm of the UNIX operating system with respect to tasks. Specifically the Execute Tasks should perform process scheduling for time-shared operations. No task should "lock up" the machine. Rogue tasks, if detected, should be terminated without prejudice. */
Looptasks = 0
/* The idle loop goes thru the tasks and gives them CPU time. While a plethora of queuing algorithms can be used (and the Execute Tasks would be modified accordingly) this loop will use a simple equation of Execution time = (CPUTime/ (Priority + 1)) scheme where CPUTime is "X" instructions. This allows all tasks some access to the CPU and does not starve out any task. Standard OS contention / semaphore algorithms apply to preclude deadlocking processes. */
CPUTime = 10000
WHILE Looptasks <= Tasks do
/* Allow task to operate AT MOST (CPU Time / (Priority + 1)) instructions. If the task does not need that many cycles (i.e. it is idle) then the task should set a flag indicating such and immediately return */
Allow task MTMTaskTable[Looptasks] to operate (CPUTime / (Priority +1)) instructions
/* If the just executed task requires subtasks to run then it set a flag, returns the task name it needs to MTM and ends. That task will now be brought into memory and all the passed parameters passed to that subtask */

IF NeedTask flag for task MTMTaskTable[Looptasks] is set DO

IF Task Requested is in MTMTaskTable, Pass task name to MTM to pass parameters and update MTM table with calling task, set LoadTask flag ELSE Pass task to MTM to allocate memory / load task and passed parameters, set AddTask flag

ENDIF

/* Likewise if a task is releasing a subtask or the task is terminating then the invention can release any subtasks to that task */

IF DontNeedTask flag for task MTMTaskTable[Looptasks] is set or Terminate flag is set DO IF DontNeedTask flag is set, Pass task and subtask name to MTM and set DontNeedTask flag If task is terminating then pass task name to MTM and set Terminate flag

ENDIF

ENDWHILE

ENDSUBROUTINE (as indicated in blocks 20, 21 and 22)

SUBROUTINE Shutdown

/* There should be sufficient power in the power supply so that after the CTM is notified of power loss a final write of all buffers on the non-volatile memory can be accomplished (if required) by the CTM. At that time the device can be shut down. The fast shutdown of the device requires that all tasks appends a "log" file (changes to that file) to the NVRAM file as changes are made to that file. When a file is "saved" the new file consists of the original file plus the "logged" changes to that file. When the new file is completely written then the old file can be deleted. This process allows the system to just flush all the buffers an not require a graceful shutdown of all tasks. */

Flush NVRAM Buffers to NVRAM device (if required)

Shut down the device

ENDSUBROUTINE

Figure 2:
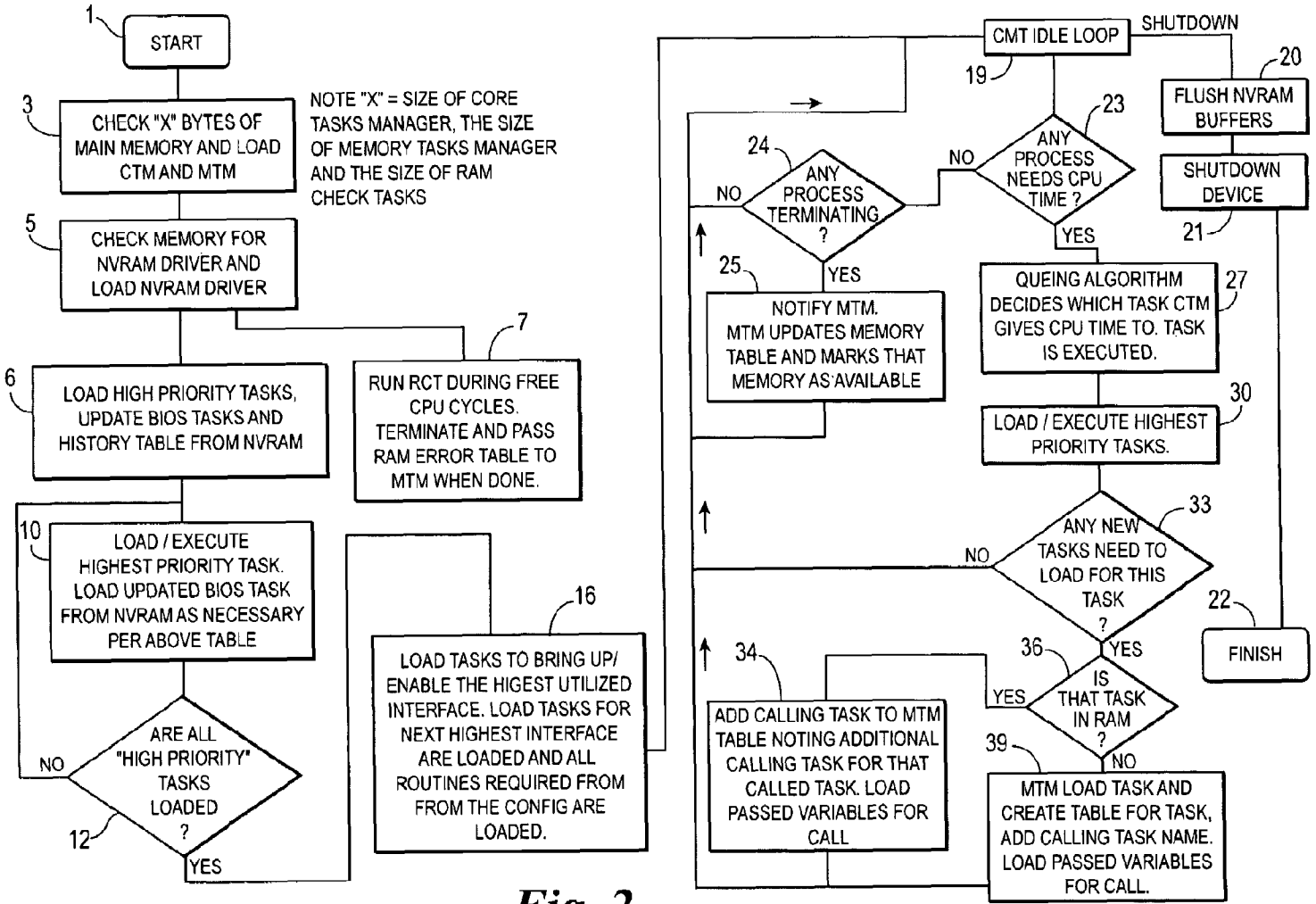
FIG. 2 is a logic flow illustration of an embodiment of the instant invention further illustrating user interface sequencing with respect to the invention's methodology.
Figure 3:
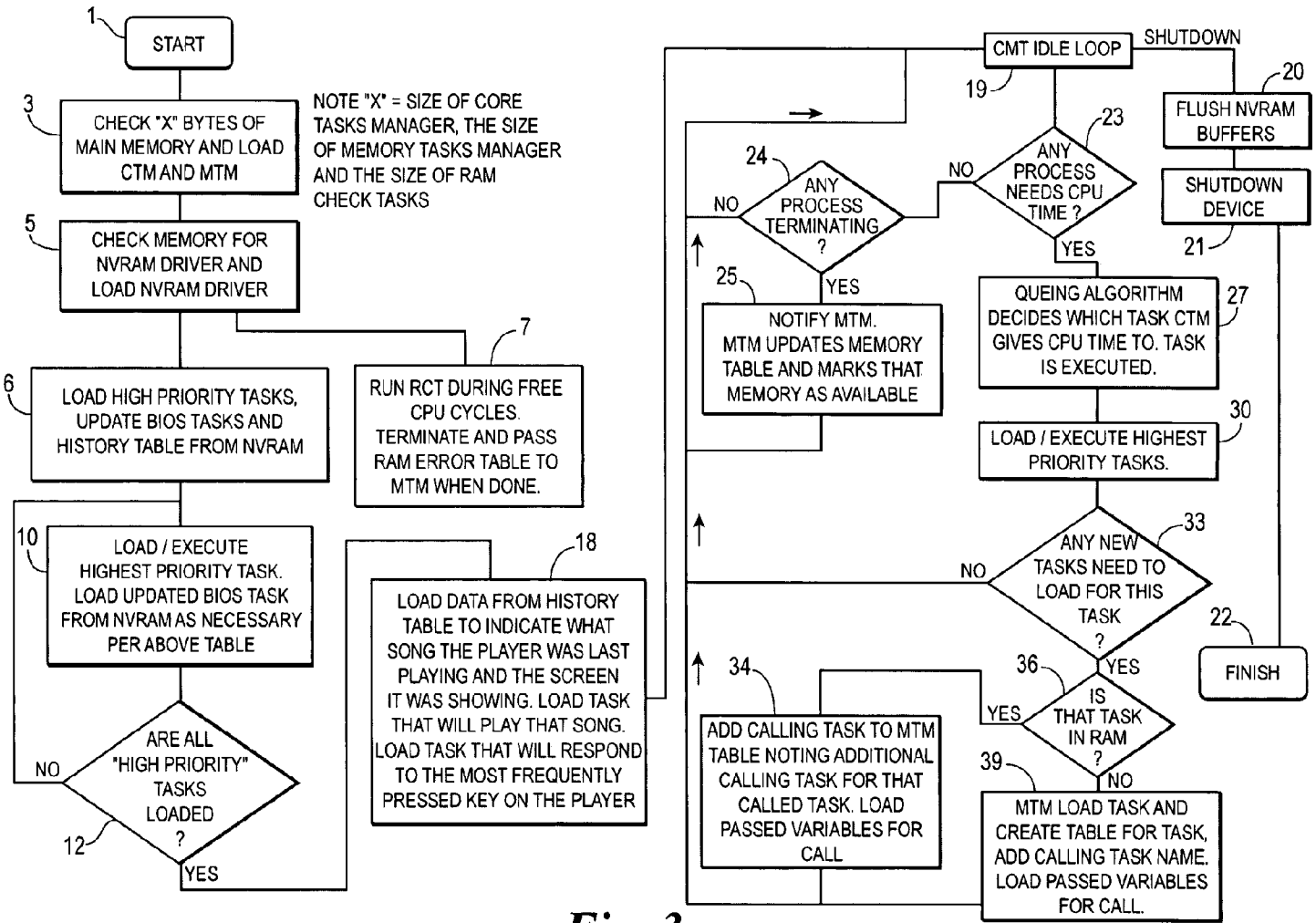
FIG. 3 is a logic flow illustration of the instant invention wherein the computing apparatus practiced is a personal digital assistant.

Complimenting the abstract, summary and detailed description as provided herein, flowcharts of logic flow sequencing associated with FIGS. 1 through 3 are immediately provided for purposes of full and enabling disclosure while illustrative logic step sequencing is denoted no such restriction is herein intended, rather the invention is capable of being practiced in a number of contexts as indicated in its versatility with respect to varying type computer apparatuses. Consequently logic flow sequencing may be altered in association therewith as will be readily apparent to those skilled in the art.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

What is claimed is:

1. A method for loading an operating system of a computing apparatus, comprising:

initiating execution of an initialization routine specific to said computing apparatus;

validating not more than substantially a portion of RAM sufficient to load at least the required portion of the initialization routine;

loading into RAM at least the required portion of the initialization routine;

reading a file to identify the programs that are minimally essential to startup processing components and tasks of high priority to said computing apparatus;

verifying not more than substantially a portion of the remaining RAM sufficient to load into the RAM at least the system and application program that are minimally essential to startup processing components prior to loading into the RAM the programs that are minimally essential to said computing apparatus;

selectively retrieving and executing said identified startup processing components based on the priority of execution;

appending to and recording in a device dependent audit reference the most recent first occurrences of operating system and application program processing component execution;

interrogating said program dependent audit reference to identify application programs that are minimally essential to said computing apparatus;

loading into RAM the highest occurrence application program at startup if the system is idle and the user has not requested an application program to start; and, recording in the above audit file the first application program the user requests.

2. The method of claim 1 further comprising the step of continuing to verify RAM as needed by the system.

3. The method of claim 1 further comprising the steps of passing dispatching control to the system and application program processing components to effectuate normal apparatus operation.

4. The method of claim 1 wherein the minimally essential application program is the user interface.

5. The method of claim 1 wherein errors produced due to the RAM validation are recorded and the RAM is marked as unusable.

6. The method of claim 1 wherein the shutdown time of the computing apparatus is reduced by allowing the computing apparatus sufficient capacitance to perform system maintenance, prevent data loss, and provide smooth almost instantaneous shutdown.

7. The method of claim 1 wherein said computing apparatus is a network equipment.

8. The method of claim 1 wherein said computing apparatus is a personal computer.

9. The method of claim 1 wherein said computing apparatus is an MP3 player.

10. A computing apparatus, comprising:

RAM;

an operating system;

a processing unit that utilizes the RAM; and an initialization routine specific to the computing apparatus and executed during boot-up by the processing unit that causes the processing unit to (1) identify system and application programs that are minimally essential to startup processing components and tasks of high priority to said computing apparatus, (2) verify not more than substantially a portion of the RAM sufficient to load system and application programs that are minimally essential to startup processing components and tasks of high priority to said computing apparatus into the verified RAM and (3) load at least system and application programs that are minimally essential to startup in the verified RAM;

means for appending to and recording in a device dependent audit reference the most recent first occurrences of operating system and application program processing component execution;

means for interrogating said device dependent audit reference to identify system and application programs that are minimally essential to startup processing components and tasks of high priority to said computing apparatus;

means for loading into RAM the highest occurrence application program at startup if the system is idle and the user has not requested an application program to start; and, means for recording in the above audit file the first application the user requests.

11. The computing apparatus of claim 10 wherein RAM validation continues as needed by the system.

12. The computing apparatus of claim 10 wherein the initialization routine dispatches control to the system and application program processing components to effectuate normal apparatus operation.

13. The computing apparatus of claim 10 wherein the application program that is minimally essential to startup processing components and tasks of high priority to said computing apparatus is the user interface.

14. The computing apparatus of claim 10 further comprising means for recording errors produced due to the RAM validation; and means for marking the RAM as unusable.

15. The computing apparatus of claim 10, further comprising means for reducing shutdown time is reduced by allowing the computing apparatus sufficient capacitance to perform system maintenance, prevent data loss, and provide smooth almost instantaneous shutdown.

16. The computing apparatus of claim 10 wherein the computing apparatus is a network equipment.

17. The computing apparatus of claim 10 wherein said computing apparatus is a personal computer.

18. The computing apparatus of claim 10 wherein said computing apparatus is an MP3 player.

*19. A method for shutting down a computer apparatus, the method comprising:*

*updating a history table to indicate a first number of user request tasks, wherein the history table includes previous information of a cumulative history of user's actions at a startup of the computer apparatus;*

*receiving one of a user interrupt and a power loss interrupt, wherein the user interrupt corresponds to a request to shut down the computer apparatus, and wherein the power loss interrupt corresponds to an immediate shutdown of the computer apparatus; and*

*saving the history table in a non-volatile memory, where in response to a subsesquent startup of the computer apparatus, the indicated first number of user request tasks are executed.*

*20. The method of claim 19, further comprising:*

*performing a final write of a plurality of memory buffers to the non-volatile memory.*

*21. The method of claim 19, wherein a log file is maintained for a first one of a plurality of operating systems and application programs executing in the computer apparatus, and further comprising:*

*performing a final write of the log file to the non-volatile memory.*

*22. A method for shutting down a router, the method comprising:*

*periodically updating a history table in a nonvolatile random access memory (NVRAM) to indicate at least one highest traffic interface;*

*receiving one of a user interrupt and a power loss interrupt, wherein the user interrupt corresponds to a request to shut down the computer apparatus, and wherein the power loss interrupt corresponds to an immediate shutdown of the computer apparatus; and*

*saving the history table in a nonvolatile random access memory (NVRAM), where in response to a subsequent startup of the router, at least one interface operation task of the indicated at least one highest traffic interface is given highest priority over at least one other interface operation task during the subsequent startup.*

*23. The method of claim 22, wherein updating the history table comprises:*

*information sufficient to identify a type of routing layer protocol used by the at least one highest traffic interface.*

*24. A method for shutting down a hand held personal device, the method comprising:*

*updating a history table to indicate a first number of user function buttons, wherein the history table includes information identifying at least one first used function button selected by the user during startup;*

*receiving one of a user interrupt and a power loss interrupt, wherein the user interrupt corresponds to a request to shut down the computer apparatus, and wherein the power loss interrupt corresponds to an immediate shutdown of the computer apparatus; and*

*saving the history table in a non-volatile memory, where in response to a subsequent startup of the computer apparatus, a task associated with the indicated at least one first used function button is loaded.*

*25. The method of claim 24, wherein the hand held personal device is a music player, wherein the function buttons correspond to stored songs, and wherein the task associated with the indicated at least one first used function button is playing a song corresponding to at least one of a last played song and a most frequently played song identified in the history table.*

*26. The method of claim 24, wherein the hand held personal device is a cell phone, wherein the function buttons correspond to phone numbers, and wherein the task associated with the indicated at least one first used function button is loading a directory of phone numbers identified in the history table.*

*27. The method of claim 24, wherein the hand held personal device is a game player, wherein the function buttons correspond to played games, and wherein the task associated with the indicated at least one first used function button is playing a game corresponding to at least one of a last played game and a most frequently played game identified in the history table.*

* * * * *